United States Patent [19]

Kikuchi et al.

[11] Patent Number: 5,072,630
[45] Date of Patent: Dec. 17, 1991

[54] CONTROL SYSTEM FOR VEHICLE WITH AUTOMATIC TRANSMISSION WITH ENGINE TORQUE CONTROL HAVING THE HYDRAULIC FLUID TEMPERATURE AS A CONTROL PARAMETER DURING SHIFTING

[75] Inventors: Toshiyuki Kikuchi, Higashihiroshima; Masaki Fujii; Mitsutoshi Abe, both of Aki; Yuji Matsuno, Hiroshima, all of Japan

[73] Assignee: Mazda Motor Corporation, Hiroshima, Japan

[21] Appl. No.: 481,326

[22] Filed: Feb. 20, 1990

[30] Foreign Application Priority Data

Feb. 21, 1989 [JP] Japan ................................. 1-42170

[51] Int. Cl.⁵ ...................... F16H 59/72; F16H 61/08
[52] U.S. Cl. .......................................... 74/858; 74/851; 74/855; 74/844
[58] Field of Search ............... 74/844, 851, 854, 855, 74/858, 866; 192/1.44

[56] References Cited

U.S. PATENT DOCUMENTS

| 4,403,527 | 9/1983 | Mohl et al. | 74/858 X |
| 4,572,029 | 2/1986 | Kinugasa et al. | 74/844 X |
| 4,724,723 | 2/1988 | Lockhart et al. | 74/854 |
| 4,733,581 | 3/1988 | Hasegawa et al. | 74/866 X |
| 4,788,890 | 12/1988 | Anderson | 74/851 |
| 4,792,902 | 12/1988 | Hroval et al. | 74/851 X |
| 4,894,780 | 1/1990 | Simonyi et al. | 74/844 X |
| 4,938,100 | 7/1990 | Yoshimura et al. | 74/858 X |
| 4,947,330 | 8/1990 | Hiramatsu | 74/866 X |
| 4,998,449 | 3/1991 | Baba et al. | 74/844 |
| 5,012,695 | 5/1991 | Kyohzuka et al. | 74/851 X |

FOREIGN PATENT DOCUMENTS 362885 4/1990 European Pat. Off. ............. 74/851

Primary Examiner—Allan D. Herrmann
Assistant Examiner—Khoi Q. Ta
Attorney, Agent, or Firm—Fleit, Jacobson, Cohn, Price, Holman & Stern

[57] ABSTRACT

A control system for a vehicle, including an automatic transmission provided with a multiple transmission gear mechanism, automatically establishes a specific gear stage of a speed ratio from among a plurality of gear stages in accordance with an vehicle operatiing condition. A shift control signal producing device produces a shift control signal in order to produce a shift operation between different gear stages in accordance with the vehicle operating condition. An engine output control device reduces an engine output in synchronism with the shift operation so as to suppress a torque shock due to the shift operation. A detecting device detects a specific vehicle operating condition in which a change in a time lag between a generation of the shift control signal and an actual initiation of the shift operation in the transmission is greater than a predetermined level and produces a signal denoting the specific vehicle operating condition. Finally, a restricting device restricts the engine output control device from reducing the engine output when the specific vehicle operating condition is detected. The torque shock due to the shift operation, therefore, can be effectively suppressed.

19 Claims, 7 Drawing Sheets

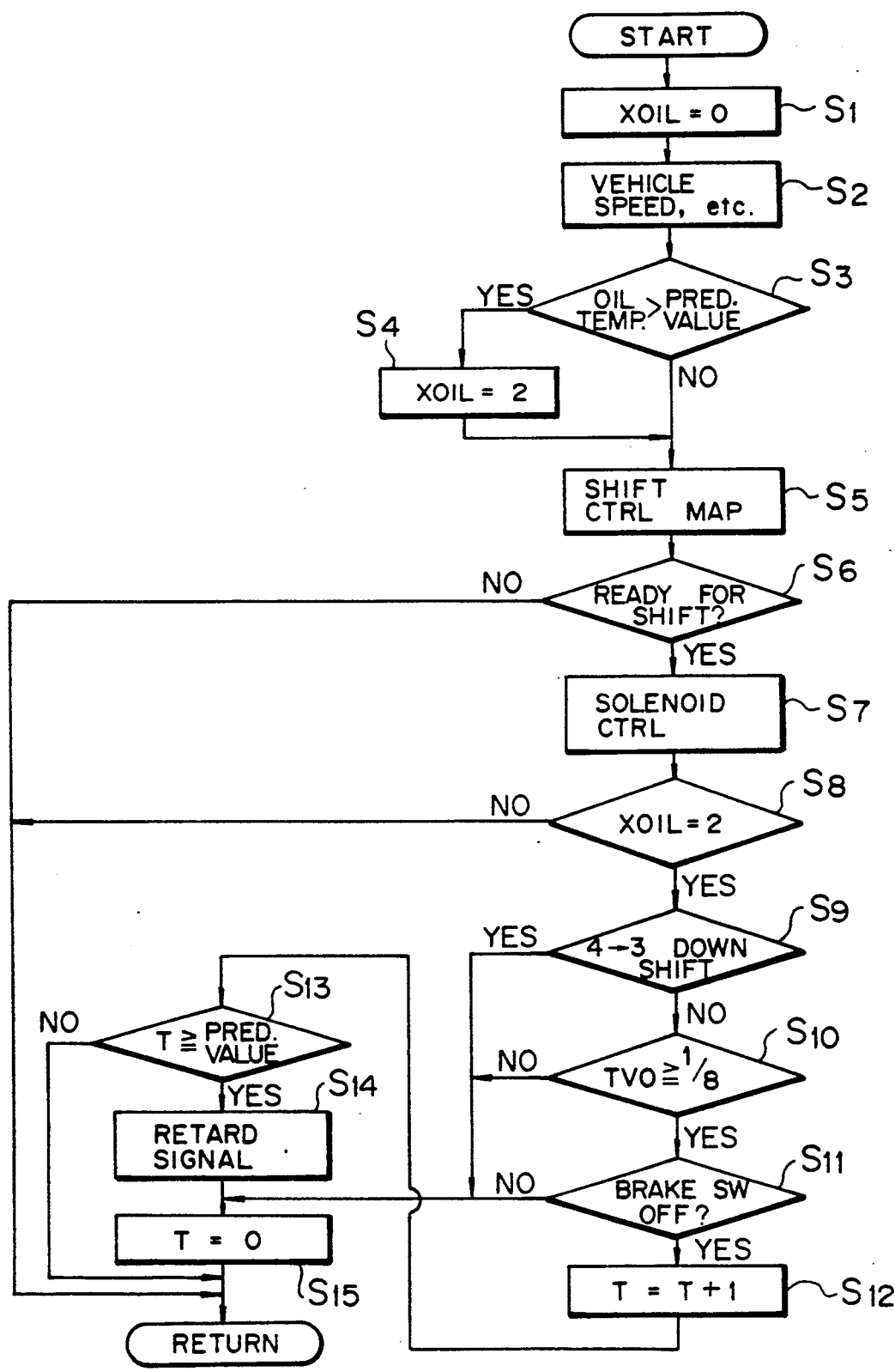

CONTROL SYSTEM FOR VEHICLE WITH AUTOMATIC TRANSMISSION WITH ENGINE TORQUE CONTROL HAVING THE HYDRAULIC FLUID TEMPERATURE AS A CONTROL PARAMETER DURING SHIFTING

CROSS-REFERENCE TO RELATED APPLICATION

The present application relates to a U.S. patent application filed on Feb. 17, 1990 in the name of the same assignee as the present application under the title of "ENGINE CONTROL SYSTEM FOR VEHICLE WITH AUTOMATIC TRANSMISSION".

BACKGROUND OF THE INVENTION

1. Field of the invention

The present invention relates to a control system for an internal combustion engine of a vehicle with an automatic transmission, and more specifically, to an output control of the engine in connection with a shift operation in the automatic transmission.

2. Description of the Prior Art

In a vehicle provided with an automatic transmission, there have been various proposals for reducing a torque shock or jolt through a shift operation from one gear stage to another in the automatic transmission. In a control system disclosed in U.S. Pat. No. 4,226,447, an ignition timing of the engine is controlled in accordance with a vehicle speed as a shift operation occurs so that an engine output power or torque is changed to reduce the torque shock due to the shift operation. U.S. Pat. Nos. 4,355,550, 4,370,903 and 4,403,527 disclose similar control systems.

In controlling the engine output during the shift operation, it should be noted that there is produced a time lag from a generation of a control signal for the shift operation to an actual initiation of the shift operation. In order to reduce the torque shock due to the shift operation effectively, it is desirable that the engine output control be made corresponding to the actual shift operation.

In view of this, the conventional ignition timing output control is adapted to be initiated to control the engine output torque after a predetermined time period from the generation of the control signal for the shift operation so that the engine output control occurs in synchronism with an actual shift operation.

It should, however, be noted that the time lag from the generation of the control signal for the shift operation to the actual initiation of the shift operation varies, depending on a vehicle operating condition such as engine speed, engine load defined by a parameter such as a throttle opening, intake gas amount and the like, line hydraulic pressure in the transmission, gear stages involved in the shift operation and the like.

Specifically, a viscosity of a hydraulic fluid or oil in the transmission affects greatly the time lag, since the shift operation is made in a manner such that a specific gear stage is established by switching power transmitting path in the transmission by virtue of the hydraulic fluid. Thus, where the viscosity of the hydraulic fluid is high, the shift operation may take long and become unstable. As a result, the engine output control may not correspond to the actual shift operation. This means that the torque shock due to the shift operation cannot be suppressed effectively because of the untimely engine output control. Moreover, the engine output control may deteriorate controllability (for example an acceleration property) of the vehicle under the vehicle operating condition where the temperature of the hydraulic fluid is low.

SUMMARY OF THE INVENTION

It is, therefore, an object of the present invention to provide a control system which can accomplish an improved controllability of a vehicle with an automatic transmission even where the vehicle is in an operating condition where a time lag between shift control signal for the transmission and an actual shift operation varies greatly.

It is another object of the present invention to provide a control system which can suppress a torque shock due to a shift operation of an automatic transmission effectively.

The above and other objects of the present invention can be accomplished by a control system for a vehicle including an automatic transmission provided with a multiple transmission gear mechanism in which a specific gear stage of a speed ratio is automatically established among a plurality of gear stages in accordance with an vehicle operating condition. A shift control signal producing device produces a shift control signal in order to make a shift operation between different gear stages in accordance with the vehicle operating condition. An engine output control device reduces an engine output in synchronism with the shift operation so as to suppress a torque shock due to the shift operation. A detecting device detects a specific vehicle operating condition in which a change in a time lag between a generation of the shift control signal and an actual initiation of the shift operation in the transmission is greater than a predetermined level. The detecting device also produces a signal denoting the specific vehicle operating condition. The control system further includes restricting device for restricting the engine output control device from reducing the engine output when the specific vehicle operating condition is detected.

Preferably, the engine output control means is constituted by ignition timing control means for controlling an ignition timing of the engine. More specifically, the ignition timing control means retards the ignition timing in response to the shift operation.

According to the present invention, a retard control signal for retarding the ignition timing is produced after a predetermined time period from a generation of a shift control signal for effecting the shift operation.

Typically, a final ignition timing is calculated in accordance with a basic ignition timing, which is determined based on an engine operating condition defined by such as engine speed, engine load, engine temperature and the like, a shift compensating value, which is determined to reduce a torque shock due to the shift operation, and a knock compensating value, which is determined to eliminate an engine knocking. The final ignition timing is compensated by a greater one of the shift compensating value and the knock compensating value.

According to the present invention, the engine output control is restricted, or not carried out, under a vehicle operation condition where the viscosity of the hydraulic fluid in the transmission is relatively high. The viscosity can be determined by detecting a temperature of the hydraulic fluid or a running distance after starting the engine in the current driving operation.

The above and other features of the present invention will be apparent from the following description and by taking reference to the accompanying drawings.

BRIEF DESCRIPTION OF THE DRAWINGS

FIG. 7 is a flow chart of a shift control in the transmission control unit similar to FIG. 2 but showing another embodiment of the present invention.

DESCRIPTION OF THE PREFERRED EMBODIMENT

Hereinafter there will be described preferred embodiments of the present invention, making reference to the drawings.

Figure 1:
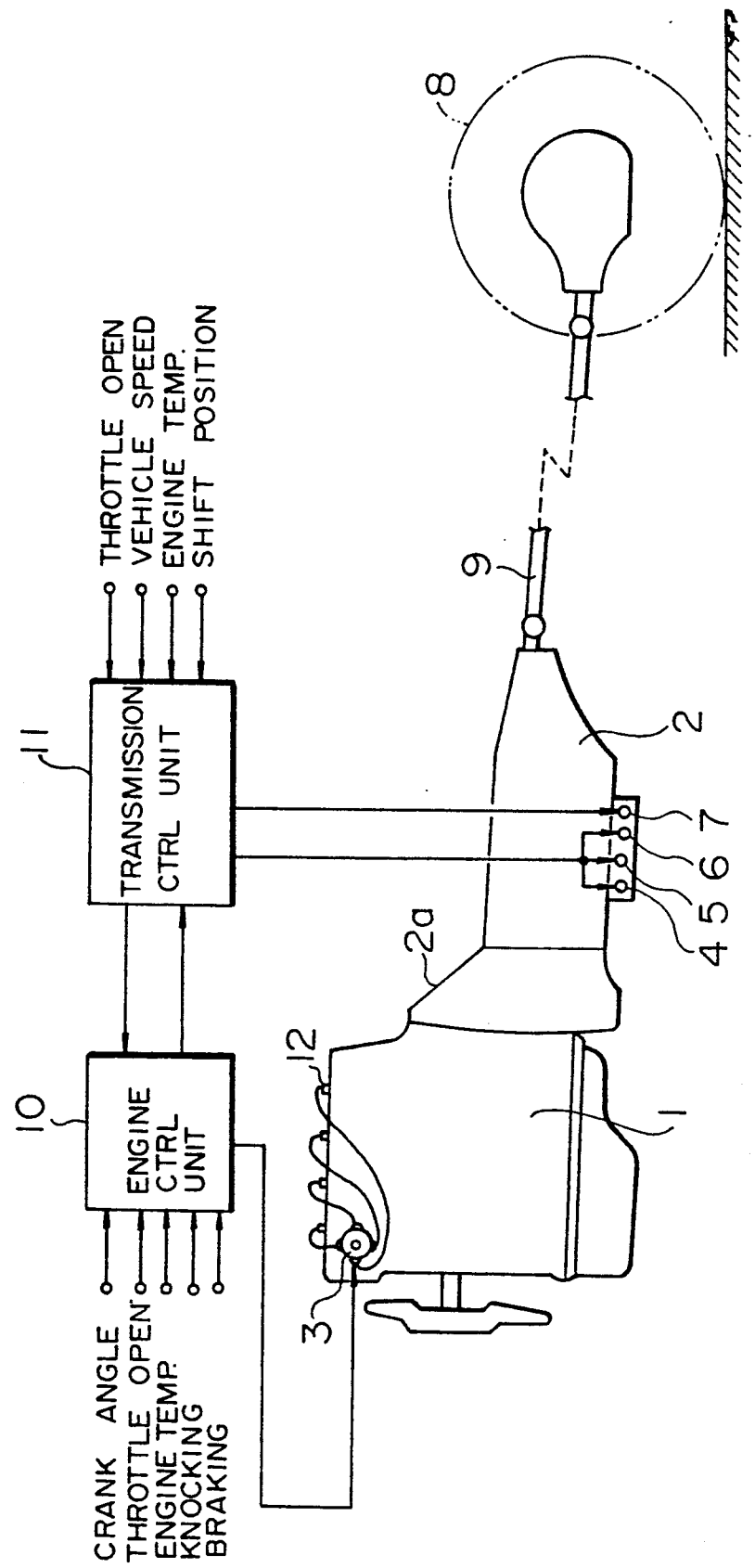
FIG. 1 is a schematic view of a power plant of a vehicle with an automatic transmission to which an engine control system in accordance with the present invention can be applied.

Referring specifically to FIG. 1, there is shown a schematic view of a power plant of a vehicle to which the present invention can be applied.

The power plant is provided with an engine 1 and an automatic transmission 2. The transmission 2 is connected with at one end with the engine 1 through a torque converter 2a. The transmission 2 is connected at the other end with a wheel 8 through a propeller shaft 9 so that an engine output power or torque is transmitted to the wheel 8 with a predetermined speed ratio. An igniter 3 is connected with respective four cylinders of the engine 1 for providing ignition plugs 12 with firing signals. The transmission 2 is provided with a multiple transmission gear mechanism therein for establishing a plurality of shift gear stages automatically in accordance with a vehicle operating condition defined by an engine speed, an engine load obtained through such parameters as throttle opening, a gear stage, an acceleration of the vehicle and the like. For this purpose, the transmission 2 is provided with shift solenoid valves 4, 5 and 6 which are adapted to control a hydraulic pressure for operating fictional elements therein so as to switch a power transmitting path of the gear mechanism. The transmission 2 is also provided with a lock-up control solenoid valve 7 for controlling an engagement and disengagement of a lock-up clutch provided in the torque converter 2a.

Internal structures of the transmission 2 and a hydraulic circuit for controlling the transmission 2 including the solenoid valves 4, 5 and 6 are well known, as is clear from U.S. Pat. No. 4,779,491 and the U.S. Patent is incorporated into the present application by reference.

In order to control operation of the engine 1, there is provided an engine control unit 10, constituted by a microcomputer.

The engine control unit 10 receives as control factors, a crank angle, a throttle valve opening, engine temperature, a braking signal denoting braking operation of the vehicle, and a knocking signal denoting an engine knock, and produces an engine control signal such as an ignition signal. Likewise, in order to control operation of the transmission 2, there is provided with a transmission control unit 11. The transmission control unit 11 receives, as control factors, the throttle valve opening, vehicle speed, engine temperature, a position of a shift lever showing a shift range currently selected, and the like. The transmission 2 controls the shift solenoid valves 4, 5 and 6 for carrying out a shift operation in which the gear stage of the multiple transmission gear mechanism is changed from one to another in accordance with a predetermined shift control map. General functions of the engine control unit 10 and the transmission control unit 11 are conventional and well known, and they are not relevant to the features of the present invention. A detailed explanation of these functions, therefore, is omitted.

A shift control signal from the transmission control unit 11 for controlling the shift solenoid valves 4, 5 and 6 is also supplied to the engine control unit 10. The engine control unit 10 receives the shift control signal and produces an ignition control signal for retarding an ignition timing in response to the shift operation so that the engine output torque is reduced during the shift operation of the transmission.

Hereinafter, there is described a retard control of an ignition timing in which the ignition timing is retarded in response to the shift operation.

Figure 2:
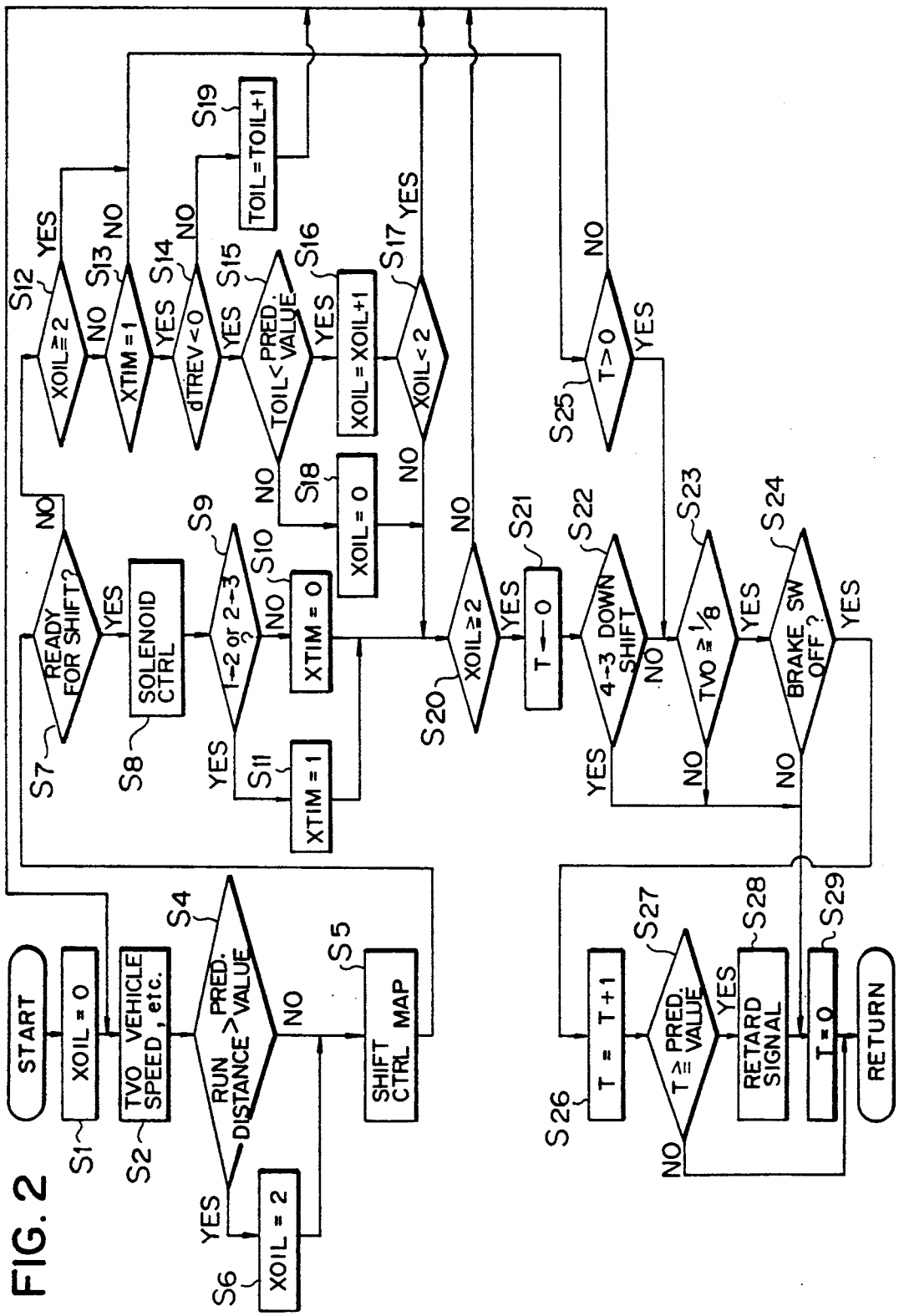
FIG. 2 is a flow chart of a shift control in a transmission control unit.

Referring to FIG. 2, a retard control of the ignition timing of the engine is shown. Steps S1–6 relate to a control for judging as to whether or not the engine output should be controlled in accordance with a running distance of the vehicle after starting driving operation in the current running operation. Steps S7–20 relate to a procedure for confirming whether or not it is preferable to actually initiate the engine output control in light of a time lag between the generation of the shift operation signal and an actual start of the shift operation. Steps S21–29 relate to a control for producing a retard control signal to the igniter 3 so as to retard the ignition timing and thereby reduce the engine output. The retard control signal is not produced to retard the ignition timing to reduce the engine output until a change in the time lag between the generation of the shift operation signal and the actual start of the shift operation in the transmission 2 becomes small in view of the running distance, or a transmission oil temperature as a result that the transmission oil is warmed up enough to provide a consistent time lag for the shift operation.

In the control, the transmission control unit 11 resets a flag XOIL for denoting allowance of the retard control (S1). Then the transmission control unit 11 reads a throttle valve opening TVO and the vehicle speed (S2). The transmission control unit 11 detect the running distance of the vehicle so as to detects the oil temperature in the transmission 2 indirectly and to judge whether or not the shift operation is ready to be made (S4). If the judgment is No or the running distance is less than a predetermined value (for example 3 Km), the transmission control unit 11 keeps the flag XOIL=0 and reads the shift control map (S5). In this case, the retard control is not carried out. On the other hand, when a cumulative number of pulse, denoting the vehicle speed is more than a predetermined value and it is found that the running distance exceeds the predetermined value, the oil temperature is deemed to be warmed up enough to provide a stable shift operation.

In this case, the transmission control unit 11 judges that the retard control is ready to be initiated and sets the flag XOIL at a value of 2 (S6). The flag XOIL is increased when the shift operation from 1-2 or 2-3 stages occurs, when the time lag TOIL is less than a predetermined value and when the shift operation is made smoothly within a predetermined time period.

In step S7, the transmission control unit 11 judges whether or not the shift operation is to be made in light of the shift control map stored in a memory thereof (S7). If the judgment is No or, the shift operation is not to be made or the shift operation may be being made, the control is returned to the starting step without any control. If the judgment is Yes or the shift operation is to be made, the transmission control unit 11 produces the shift control signals to the shift control solenoid valves 4, 5 and 6 to carry out the shift operation (S8). In this case, if the shift operation occurs between 1-2 stages or 2-3 stages, a shift flag XTIM is set at a value 1 (S11). If the shift operation occurs between two gear stages other than the 1-2 or 2-3, the shift flag is set at a value of 0 (S10). In this case, the control is returned to step S2 because the flag XOIL takes the value of 0 (S20) and then goes again to step S7. In step S7, it is judged that the shift operation is being made. This means that the judgment in step S7 is No. Therefore, the proceeding goes to the starting step again through the steps S12, since the flag XOIL=0, S13, since the flag XTIM=0, and S25.

Figure 6:
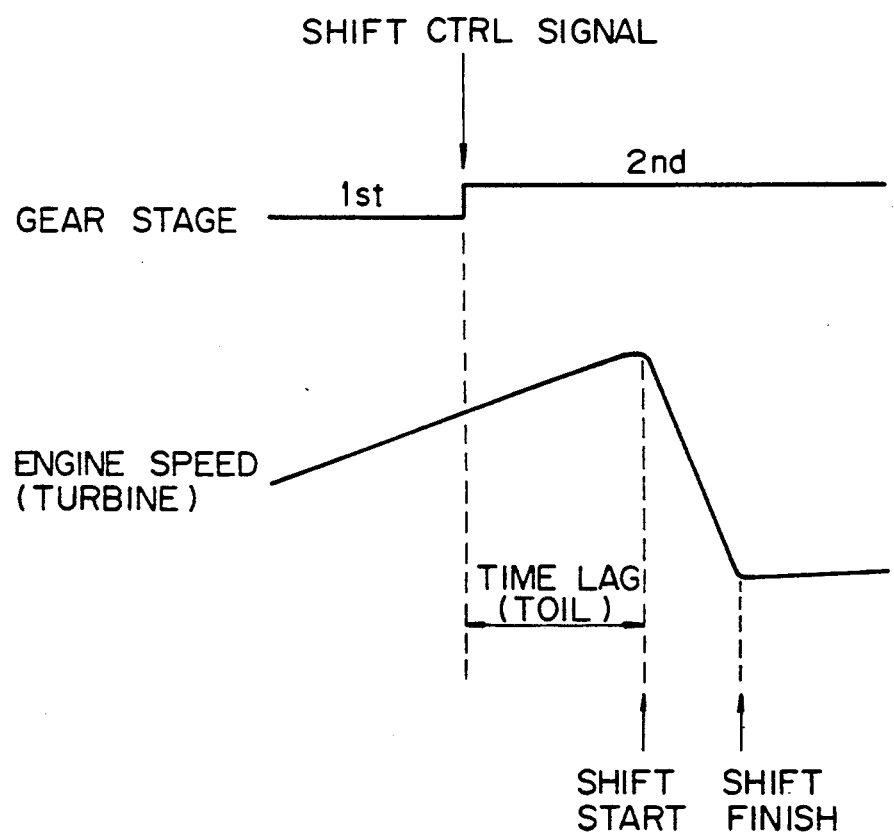
FIG. 6 is a graphical representation showing a conceptual view of a shift operation.

If, in step S9, it is determined that the shift operation occurs between the 1-2 or 2-3 stages, the flag XTIM takes the value of 1 in step S11. The proceeding ultimately reaches step S7 again, after taking steps S20, S2, S4 and S5 or S6. In this case, the proceeding is advanced past steps S12 and S13 to step S14 because the flag XOIL is 0 and the flag XTIM has taken the value of 1. In step S14, the transmission control unit 11 judges whether or not the shift operation is actually initiated. In detail, when the shift operation is made between the 1-2 or 2-3 stages, the shift control signal is produced so that the solenoid valves 4, 5 and 6 are actuated. In this case, a certain time lag is present before the oil or hydraulic fluid in the transmission moves frictional elements such as clutches to actually initiate the shift operation. In the course of the shift operation, the engine speed (turbine speed) changes, as shown in FIG. 6. When the accelerating operation is made by kicking an acceleration pedal down to increase the stroke thereof so as to increase the engine speed, the transmission control unit 11 provides the shift control signal to the solenoid valves 4, 5 and 6 in light of the shift control map. In this case, the engine speed continues to be increased for a certain time period after the shift control signal is produced. When the shift operation is actually initiated, the engine speed begins to be reduced. The engine speed is finally controlled to a value in accordance with a gear ratio of the gear stage selected as shown in FIG. 6.

Where the shift operation is not initiated or an engine speed change dTREV is not a negative value, the time lag TOIL between the generation of the shift operation signal and the actual initiation of the shift operation is increased (S19). This proceeding continues until the engine speed change dTREV takes a negative value. In step S15, the value of the time lag TOIL is compared with a predetermined time period. If the time lag TOIL is greater than the predetermined value, that is, when it takes a long time before the actual initiation of the shift operation, the flag XOIL is reset (S18). Then, the proceeding is returned to the starting step through the step S20.

On the other hand, where the time lag TOIL is smaller than the predetermined value or where the shift operation is deemed to be smoothly an stably made, the flag XOIL is increased and the proceeding is returned to the starting step through step S17. This proceeding is carried out repeatedly until the flag XOIL takes the value of 2 ( until the shift operation between the 1-2 or 2-3 is completed smoothly and stably at least twice in series).

Once it is determined from the above procedure that the retard control can be started, the retard control is carried out, unless a prohibiting condition is established in steps S22, S23 and S24.

In the procedure for carrying out the retard control, the transmission control unit 11 sets a retard control counter T at a value of zero (S21). The retard control counter T is provided for deferring a start of the retard control of the ignition timing by a predetermined time period after the shift control signal is generated. When the shift operation is to be a down shift from a fourth stage to a third stage, the retard control is not carried out because this down shift operation does not cause a serious torque shock inherently (S22). When the throttle opening is less than one-eighth, the retard control is not carried out because it may cause an ignition failure (S23). Further, when the braking operation is made (a brake switch is On), the retard control of the ignition timing is not carried out (S24). In the case where the retard control is carried out, the transmission control unit 11 increases the value of the timer T (S26) until the value attains a predetermined value (S27). When the value of the timer T reaches the predetermined value, the transmission control unit 11 produces the retard control signal (S28). In step S29, the value of the timer T is reset.

Meanwhile, once the flag XOIL reaches the value of 2, the steps S14–S19 are skipped. Thus, the proceeding goes from the step S12 or S13 to the step S25.

Hereinafter, there is described the retard control by the engine control unit 10.

Figure 3:
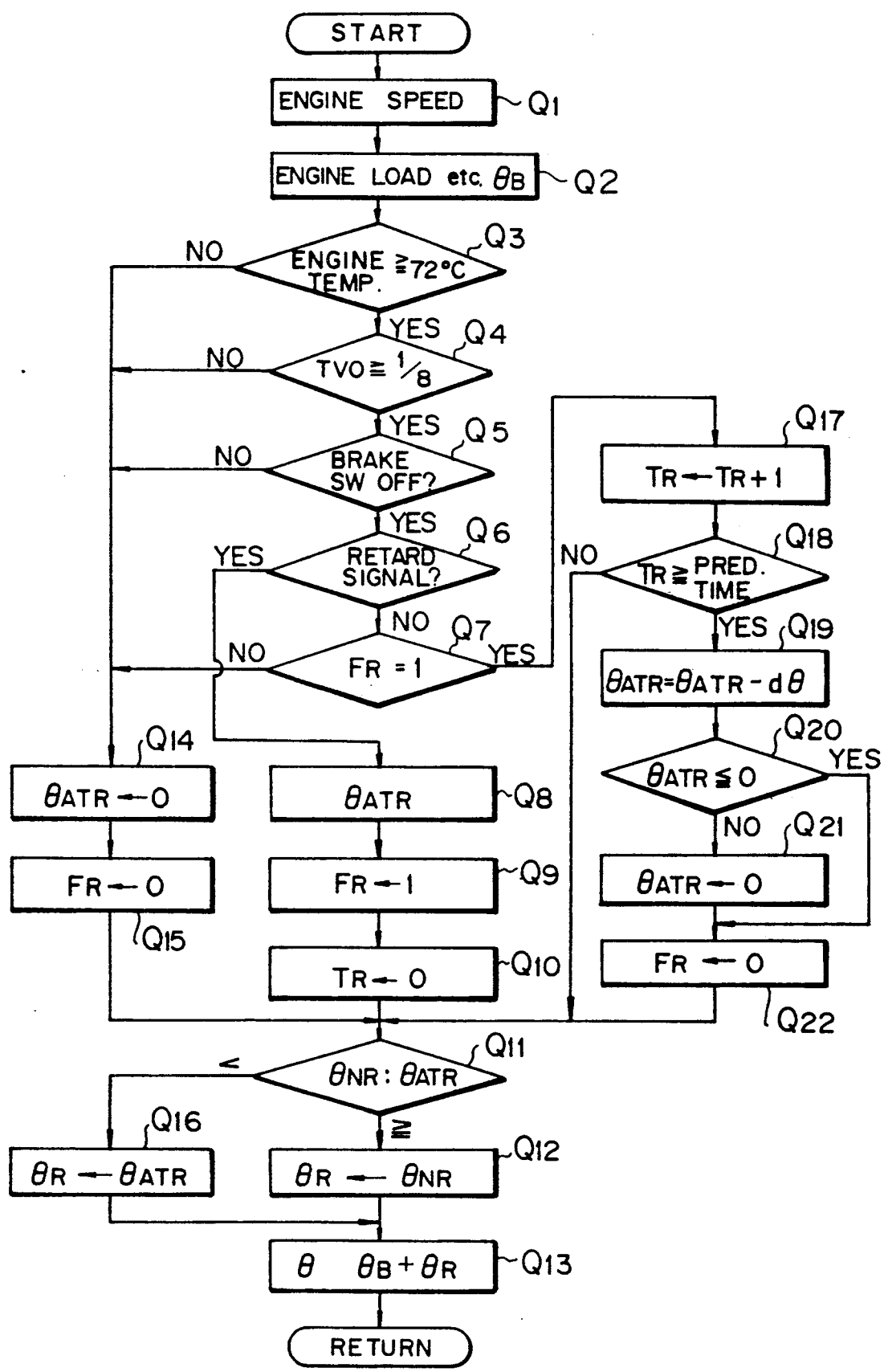
FIG. 3 is a flow chart of an ignition timing control in an engine control unit.

Referring to FIG. 3, the engine control unit 10 receives as control factors the engine speed, the engine load (throttle opening) and the engine temperature (engine coolant temperature) (Q1) and determines a basic ignition timing $\Theta B$ (Q2).

According to the illustrated embodiment, a retard angle $\Theta ATR$ in the ignition timing is determined (Q8) in light of a map (not shown) stored therein when the engine temperature is higher than a predetermined value (72 degrees centigrade in this embodiment) (Q3), the throttle valve opening TVO is greater than one-eighth (Q4), the braking operation is not detected (Q5) and the retard control signal is introduced from the transmission control unit 11 (Q6). In this case, a retard control flag FR is set at a value of 1 (Q9) and a retard period counter Tr is reset (Q10).

In step Q7, where the retard control flag FR is set at 1 even when the retard control signal is not introduced into the engine control unit 10 in the current processing cycle, it means that the retard control is now continued. Therefore, the retard period counter TR is increased (Q17) until it reaches a predetermined value (Q18).

On the other hand, where the retard control is not carried out, the retard angle $\Theta ATR$ is set at zero (Q14) and the retard control flag FR is reset (Q15).

In step Q18, after the retard period counter TR reaches the predetermined value, the retard angle $\Theta ATR$ is reduced by a value $d\Theta$ in each processing cycle (Q19) unless the retard angle $\Theta$ is reduced below zero (Q20). Finally, the retard angle $\Theta ATR$ is set at zero. The retard control counter FR is reset (Q22).

After obtaining the retard angle $\Theta ATR$ through the above procedure from step Q6 to Q22, the transmission control unit 11 determines a final ignition timing $\Theta$ through steps Q11 to Q13.

In step Q11, the transmission control unit 11 compares the retard angle $\Theta ATR$ with a knocking retard angle $\Theta NR$ and uses a greater one as a final compensating angle $\Theta R$ for the ignition timing $\Theta$ (Q12, Q16). The final ignition timing $\Theta$ is obtained by adding the final compensating angle $\Theta R$ to the basic ignition timing $\Theta B$ (Q13).

Figure 4:
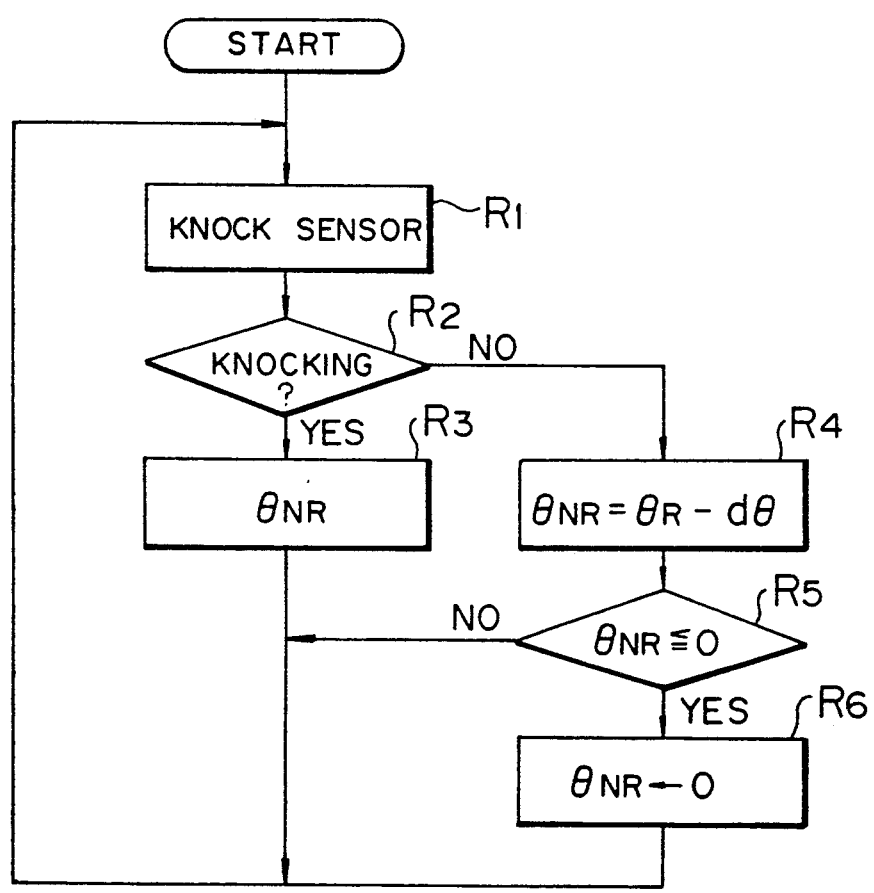
FIG. 4 is a flow chart of a procedure for obtaining a knocking retard angle in the engine control unit.

Referring to FIG. 4, there is shown a flow chart of a procedure for obtaining the knocking retard angle $\Theta NR$ which is determined so as to suppress knocking by controlling the ignition timing. The engine control unit 10 receives a signal from a knocking sensor (not shown) mounted on the engine 1 (R1). The knocking sensor is well known in the field of the present invention so that a detailed explanation thereto is omitted. For the purpose of the present invention, any kind of conventional knocking sensor can be employed. When knocking is detected by the knocking sensor, the engine control unit 10 determines the knocking retard angle $\Theta NR$ in accordance with an intensity of the knocking (R3). On the other hand, when the knocking is not detected, the engine control unit 10 reduces the knocking retard angle $\Theta ATR$ by the value $d\Theta$ toward zero in each processing cycle (R2-R6).

Figure 5:
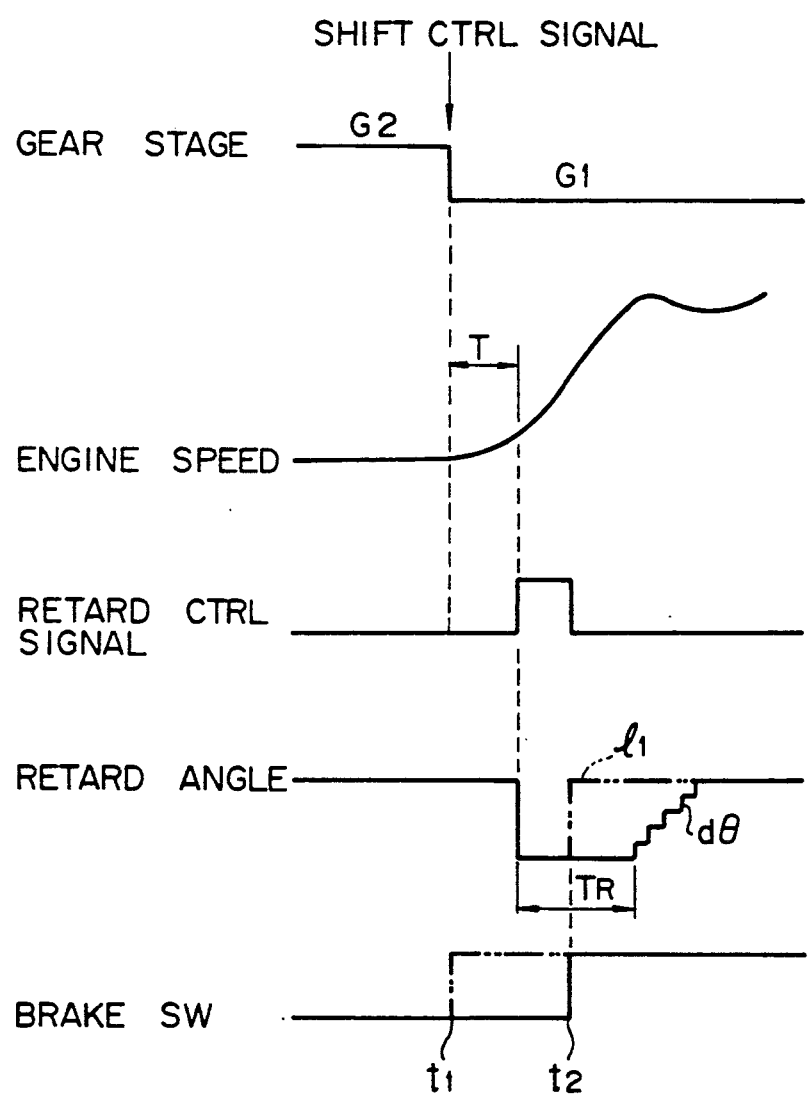
FIG. 5 is a graphical representation showing a time chart in the ignition timing control.

Accordingly, when the shift operation is made from one gear stage G2 (for example 2nd stage) to another G1 (for example 1st stage), the retard control signal is introduced from the transmission control unit 11 to the engine control unit 10 after the predetermined period T from the generation of the shift control signal to the solenoid valves 4, 5 and 6 as shown in FIG. 5. The retard control of the ignition timing continues for the predetermined time period TR with the constant value of the retard angle $\Theta R$ and thereafter the retard angle $\Theta ATR$ is gradually reduced toward zero.

In this case, when the braking operation is made at a timing t1 at which the retard control signal is not introduced into the engine control unit 10, the retard control is cancelled. If the braking operation is made at a timing t2 at which the retard control is already initiated, the retard control is suspended immediately as shown in line 11 in FIG. 5.

Referring to FIG. 7, there is shown a flow chart of a shift control in accordance with another embodiment of the present invention. In this embodiment, the oil temperature for the transmission is directly detected and used for the control. The oil temperature can be detected any conventional way. In the control, the transmission control unit 11 sets the flag XOIL at the value of 0 (S1) and reads the throttle opening TVO, the vehicle speed and the like (S2). Then, the transmission control unit 11 judges whether or not the oil temperature is higher than a predetermined value (100 degrees centigrade in this embodiment) (S3). If the judgment is Yes or the oil temperature is higher than the predetermined value, the flag XOIL is set at the value of 2 so that the retard control is permitted to be made (S4). If the judgment is No, the transmission control unit 11 keeps the flag XOIL=0. In this case, the retard control is not carried out. In step S5, the transmission control unit 11 reads the shift control map and judges whether or not the shift operation is to be made in light of the shift map (S6). If the judgment in step S6 is Yes, the transmission control unit 11 produces the control signals to the solenoid valves 4, 5 and 6 for carrying out the shift operation (S7). If the judgment in step S6 is No, the proceeding is returned to the starting step. In step S8, the transmission control unit 11 judges whether or not the flag XOIL has the value of 2 and, therefore the retard control is ready to be made. If Yes, the transmission control unit 11 carries out the same steps as the former embodiment shown in FIG. 2. Namely, the transmission control unit 11 produces the retard control signal when the counter T reaches the predetermined value (S9-S15 in FIG. 7). If No, the proceeding is returned to the starting step. Receiving the retard control signal, the engine control unit 10 carries out the retard control in accordance with the procedures shown in FIGS. 3 and 4 as aforementioned.

According to the above ignition timing control, the retard control is not carried out in the case where a specific vehicle operating condition in which a change in a time lag between a generation of the shift control signal and an actual initiation of the shift operation in the transmission is greater than a predetermined level is detected. However, this invention is not limited to this control but; the retard angle $\Theta ATR$ can be reduced in response to the specific vehicle operating condition.

It will be apparent from the above that many modifications and variations may be made, based on the above descriptions by those skilled in the art, without departing from the scope of the following claims.

We claim:

1. A control system for a vehicle, comprising:
   an automatic transmission provided with a multiple transmission gear mechanism in which a specific gear stage, with a particular speed ratio, is automatically established from among a plurality of gear stages in accordance with at least one vehicle operating condition,
   a transmission control unit for generating a shift control signal in order to produce a shift operation between different gear stages in accordance with the at least one vehicle operating condition, and
   an engine control unit for reducing an engine output in synchronism with the shift operation so as to suppress a torque shock due to the shift operation, wherein
   said transmission control unit detects a specific vehicle operating condition, in which a time lag between generation of the shift control signal and an actual initiation of the shift operation in the automatic transmission is greater than a predetermined value and producing a signal denoting the specific vehicle operating condition, reduction of the engine output being restricted when said specific vehicle operating condition is detected, the shift operation being carried out by virtue of a hydraulic fluid, the transmission control unit detecting a parameter connected with a viscosity of the hydraulic fluid.

2. A control system as recited in claim 1 wherein the parameter pertains to a temperature of the hydraulic fluid.

3. A control system as recited in claim 2 wherein the transmission control unit detects a temperature of the hydraulic fluid.

4. A control system as recited in claim 3 wherein the engine output is not controlled in connection with the shift operation when the temperature of the hydraulic fluid is lower than a predetermined value.

5. A control system as recited in claim 2 wherein the transmission control unit detects a running distance after driving operation is started so as to determine if the temperature of the hydraulic fluid is sufficiently high to provide a stable shift operation.

6. A control system as recited in claim 5 wherein the engine output is not controlled in connection with the shift operation when the running distance does not exceed a predetermined value.

7. A control system as recited in claim 2 wherein the transmission control unit detects the time lag between the generation of the shift control signal and the actual initiation of the shift operation between specific gear stages so as to determine if the temperature of the hydraulic fluid is sufficiently high to provide a reduced torque shock shifting operation.

8. A control system as recited in claim 7 wherein the engine output is not controlled in connection with the shift operation when the time lag is greater than a predetermined time period.

9. A control system as recited in claim 1 wherein the transmission control unit detects a running distance after driving operation is started and the time lag between the generation of the shift control signal and the actual initiation of the shift operation, the engine output not being controlled in connection with the shift operation when the running distance does not exceed a predetermined value and the time lag is greater than a predetermined time period.

10. A control system as recited in claim 1 wherein the engine control unit includes an ignition timing control for controlling an ignition timing of the engine.

11. An engine control system as recited in claim 10 wherein the ignition timing control retards the ignition timing in response to the shift operation.

12. A control system as recited in claim 11 wherein a retard control signal for retarding the ignition timing is produced a predetermined time period after a generation of a shift control signal for effecting the shift operation.

13. A control system as recited in claim 10 wherein a final ignition timing is calculated in accordance with a basic ignition timing, which is determined based on an engine operating condition, an ignition timing compensating value, which is determined to reduce a torque shock due to the shift operation, and an anti-knock ignition timing compensating value, which is determined to eliminate engine knocking.

14. A control system as recited in claim 13 wherein the final ignition timing is compensated by a greater one of the shift compensating value and the knock compensating value.

15. A control system as recited in claim 1, and further comprising switching means for switching a power transmitting path to change gear stages, and wherein said transmission control unit introduces a shift control signal to the switching means and said engine control unit receives the shift control signal from the transmission control unit to change the engine output.

16. A control system as recited in claim 15 wherein said switching means comprises shift solenoid valves for switching a hydraulic path to establish a selected gear stage of the transmission, said control system further comprising an engine output changing means, comprising an ignitor, for changing the engine output.

17. A control system for a vehicle comprising an automatic transmission provided with a multiple transmission gear mechanism in which a specific gear stage of a speed ratio is automatically established among a plurality of gear stages in accordance with an vehicle operating condition,
shift control signal producing means for producing a shift control signal in order to make a shift operation between different gear stages in accordance with the vehicle operating condition,
engine output control means for reducing an engine output in synchronism with the shift operation so as to suppress a torque shock due to the shift operation,
oil temperature detecting means for detecting a temperature of a hydraulic fluid in the automatic transmission, and
prohibiting means for prohibiting a control of the engine output by the engine output control means when the temperature of the hydraulic fluid is lower than a predetermined value.

18. A control system for a vehicle comprising an automatic transmission provided with a multiple transmission gear mechanism in which a specific gear stage of a speed ratio is automatically established among a plurality of gear stages in accordance with an vehicle operating condition,
shift control signal producing means for producing a shift control signal in order to make a shift operation between different gear stages in accordance with the vehicle operating condition,
engine output control means for reducing an engine output in synchronism with the shift operation so as to suppress a torque shock due to the shift operation,
running distance detecting means for detecting a running distance of the vehicle after starting driving operation, and
prohibiting means for prohibiting a control of the engine output by the engine output control means when the running distance does not exceed a predetermined value.

19. A control system for vehicle comprising:
an automatic transmission provided with a multiple transmission gear mechanism in which a specific gear stage, with a particular speed ratio, is automatically established from among a plurality of gear stages in accordance with at least one vehicle operating condition,
a transmission control unit for generating a shift control signal in order to produce a shift operating between different gear stages in accordance with the at least one vehicle operating condition, and
an engine control unit for reducing an engine output in synchronism with the shift operation so as to suppress a torque shock due to the shift operation, wherein said transmission control unit determines a time lag between a generation of the shift control signal and an actual initiation of the shift operation between specific gear stages of the automatic transmission, and control of the engine output by the engine control unit is prohibited when the time lag is longer than a predetermined time period.

* * * * *